United States Patent [19]

Fairhurst

[11] Patent Number: 5,051,827
[45] Date of Patent: Sep. 24, 1991

[54] TELEVISION SIGNAL ENCODER/DECODER CONFIGURATION CONTROL

[75] Inventor: Jon Fairhurst, Grass Valley, Calif.

[73] Assignee: The Grass Valley Group, Inc., Nevada City, Calif.

[21] Appl. No.: 471,561

[22] Filed: Jan. 29, 1990

[51] Int. Cl.[5] .............................................. H04N 7/04
[52] U.S. Cl. ................................... 358/141; 358/160; 358/10; 358/29; 358/32; 358/143
[58] Field of Search .................. 358/141, 143, 160, 31, 358/37, 194.1, 10, 29, 32

[56] References Cited

U.S. PATENT DOCUMENTS

| | | | |
|---|---|---|---|
| 4,285,004 | 8/1981 | Morrison | 358/10 |
| 4,314,272 | 2/1982 | Miyaji | 358/10 |
| 4,326,219 | 4/1982 | Griesshaber | 358/10 |
| 4,340,903 | 7/1982 | Tamura | 358/10 |
| 4,396,938 | 8/1983 | Dischert | 358/32 |
| 4,742,387 | 5/1988 | Oshima | 358/29 |
| 4,746,970 | 5/1988 | Hosokawa | 358/29 |
| 4,821,121 | 4/1989 | Beaulier | 358/160 |
| 4,835,613 | 5/1989 | Johnson | 358/160 |
| 4,870,491 | 9/1989 | Ishii | 358/160 |
| 4,907,082 | 3/1990 | Richards | 358/143 |
| 4,991,119 | 2/1991 | Traa | 358/10 |

Primary Examiner—John K. Peng
Assistant Examiner—Sherrie Hsia
Attorney, Agent, or Firm—Francis I. Gray; John Smith-Hill

[57] ABSTRACT

A television signal encoder/decoder control provides for quick and easy modification of circuit parameters for a television encoder/decoder. A microprocessor interfaces with both local and remote interfaces for obtaining parameter data, sets up the encoder/decoder according to the parameter data, and then stores the resulting setup parameters as a preset. The preset may then be instantaneously recalled and the encoder/decoder set up in the stored configuration in the space of a video signal vertical interval.

8 Claims, 6 Drawing Sheets

TELEVISION SIGNAL ENCODER/DECODER CONFIGURATION CONTROL

BACKGROUND OF THE INVENTION

The present invention relates to instrument configuration control, and more particularly to a television signal encoder/decoder control system for controlling the timing, format conversion, level adjustment, signal processing techniques and filters endemic to television encoders or decoders.

Prior television signal encoders and decoders, such as the CV-25 encoder and the CV-24 decoder manufactured by The Grass Valley Group, Inc. of Grass Valley, Calif., United States of America, have been controlled by simple switches and knobs, allowing an operator to configure and adjust the unit to perform in a single particular manner. Generally when the operator needs to change the configuration, the operator must physically change the position of the controls, one at a time, until the new configuration is achieved. This process, when compared with the speed of each frame of video, is extremely slow, especially if the changes require test equipment for fine levels of adjustment. Also once a configuration has been altered, it is not easy to return to the original configuration.

Most recent improvements in encoders and decoders, such as the EMPHASYS encoders/decoders manufactured by The Grass Valley Group, Inc. of Grass Valley, Calif., United States of America, have come through improved signal processing techniques for the elimination or reduction of artifacts common to encoding and decoding. In general these processes reduce cross-color and cross-luminance errors, i.e., artifacts due to chrominance and luminance being improperly separated, increase fine detail definition, reduce noise and the like. Some of these improved signal processing techniques are described in detail in U.S. Pat. Nos. 4,819,061 and 4,847,683. Although these processes can make huge improvements on most picture material, some images or portions of images are often distorted or improperly acted upon by these processes. In short no one process is ideal for all video picture material or for the subjective tastes of all observers. Therefore configuration control of the encoders/decoders is desirable.

What is desired is a television signal encoder/decoder control that quickly and easily modifies the configuration of encoders and decoders, including signal processing techniques, and recalls the configuration at a fast enough rate to coincide with changes in the picture material.

SUMMARY OF THE INVENTION

Accordingly the present invention provides a television signal encoder/decoder control for real time control of encoder or decoder configurations, including signal processing techniques, and for storing and recalling a variety of settings through a variety of interfaces. These interfaces include a front panel interface for local control, and parallel and serial remote interface structures to support connection with a switch panel for direct control, to support connection with general purpose computers, and to support connection to more specialized computers, such as television signal editors or television signal switchers. A microprocessor system with associated program and working memories receives timing from a vertical sync pulse derived from an input video signal, the vertical sync pulse acting as an interrupt to the microprocessor system. A data bus is coupled between the microprocessor system and a plurality of registers, the registers being coupled in turn to the encoder or decoder being controlled. An address bus also is coupled between the microprocessor system and an appropriate address decoder that provides strobes to latch the data on the data bus into the appropriate latches, or to latch data from the controlled device into the appropriate register for transmission to the microprocessor system. The result is a television signal encoder/decoder control that, in response inputs from either the front panel or from remote control sources, provides new parameter information to the encoder or decoder during the vertical interval of a video signal for fast and reproducible configuration control. Configurations may be stored and recalled simply by storing the parameters for a particular configuration in memory, and in response to a single input command recalling that configuration for execution during the vertical interval.

The objects, advantages and other novel features of the present invention are apparent from the following detailed description when read in conjunction with the appended claims and attached drawing.

DESCRIPTION OF THE PREFERRED EMBODIMENT

Figure 1:
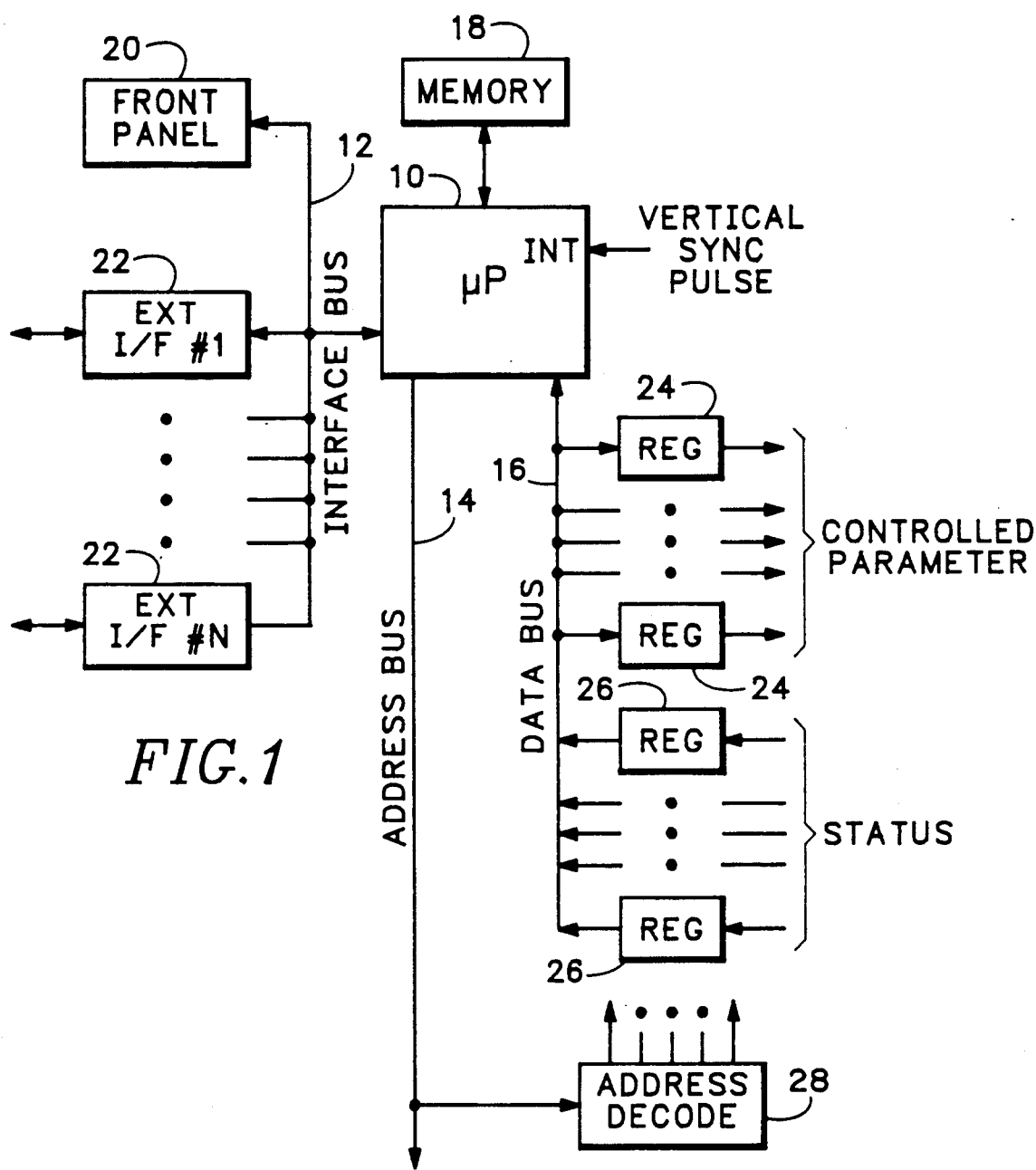
FIG. 1 is a block diagram of a television signal encoder/decoder control according to the present invention.

Referring now to FIG. 1 a television signal encoder/decoder has a microprocessor 10 with an interface bus 12, an address bus 14, a data bus 16 and associated memories 18. Coupled to the interface bus 12 is a front panel interface 20 for the local control and a plurality of parallel and serial external interfaces 22 for remote control of the encoder/decoder. Coupled to the data bus 16 are a plurality of registers 24, 26 for transferring parameter data between the controllable circuits of the encoder/decoder and the microprocessor 10. An address decoder 28 is coupled to the address bus 14 for selecting a particular one of the registers 24, 26 for access by the microprocessor 10 according to an address generated by the microprocessor program. Also input to the microprocessor 10 as an interrupt is a vertical sync pulse derived from a reference sync generator or from an input video signal, as is well known in the art.

In operation an operator, accessing the encoder/decoder either via the front panel interface 20 or one of the external interfaces 22, sets up the encoder/decoder as will be explained in greater detail below. The microprocessor 10 implements the setups made by the operator at each vertical sync pulse by outputting the resulting parameter data onto the data bus and addressing the particular register 24 via the address decoder 28 to load the data for use by the specific circuits associated with that register. Once the encoder/decoder has been set up, the operator stores the parameter data in a single storage access location, the microprocessor 10 storing the parameter data from the registers 26 under a single location index. When the operator wishes to return to that particular configuration again, the operator selects the single location index and the microprocessor 10 automatically loads all the registers 24 with the stored parameter data. See U.S. Pat. No. 4,205,344 for a detailed description of the storing and recall operation.

Figure 2:
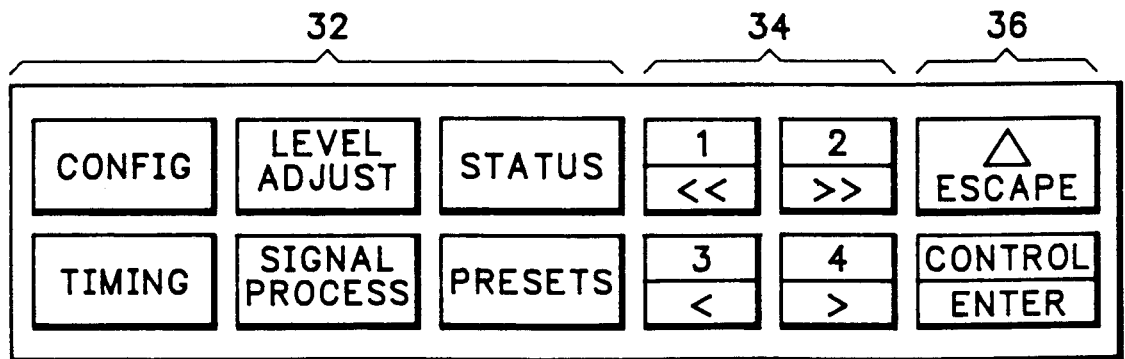
FIG. 2 is a plan view of a front panel interface for the television signal encoder/decoder control of FIG. 1.

A control keyboard 30 for the front panel interface is shown in FIG. 2. There are variously labeled function control buttons 32, a small numerical keypad 34 for entering selections and parameter data, and variously labeled execution control buttons 36. The operation of these various controls on the control keyboard is described with respect to FIGS. 3–7. The specific parameters that may be controlled in an encoder/decoder are: 1) gain and offset levels into the encode/decode matrices so that a variety of component television signal standards may be encoded/decoded and so that non-standard levels may be compensated or varied for artistic reasons; 2) chrominance filter responses, either discrete responses selected from a table or continuously variable responses, so that trade-offs between bandwidth, ringing, over- and undershoots, aliasing and decoder cross-luminance may be made; 3) luminance filter responses, either selected from a lookup table or continuously variable, may be used to boost or decrease fine picture detail or noise by acting upon the vertical, horizontal and temporal dimensions of the television signal, to compensate the incoming signal or the analog to digital signal conversion process or for artistic reasons, and includes non-linear techniques such as level dependent responses; 4) the delay from input to output of the encoder/decoder may be controlled so that it works in a variety of environments, as well as for providing delayed versions of the input signals as auxiliary outputs; 5) anti-artifact processing in one, two or three dimensions to eliminate cross-color and/or cross-luminance effects may be varied continuously or selected from two or more options; 6) the selection or insertion of televisions test signals in the encoder/decoder may be controlled; 7) timing delays and durations of blanking, sync, burst and burst envelope relative to some external timing reference may be controlled; 8) delays and timing parameters of an external timing reference may be controlled; 9) functions of the various interfaces 20, 22 may be independently enabled or limited and priorities may be assigned to the interfaces so that one interface may selectively override another; 10) selection of normal encoding/decoding or monochrome operation with or without burst; 11) non-standard signal routing for the purpose of fault location and/or unit evaluation and self testing control for the encoder/decoder; 12) display or communication of encoder/decoder status, including information concerning the configuration of the unit and results of self tests; 13) control of memory for storing and recalling all possible configurations by the various interfaces; 14) control of the encoder/decoder on a frame by frame basis synchronously with the video signal during the vertical interval so that operation of the encoding or decoding process can be selected or modified for technical or artistic reasons based upon video signal content, source or destination in a real time manner; and 15) upload and download of parameters to/from an external memory via the remote interfaces 22.

Figure 3:
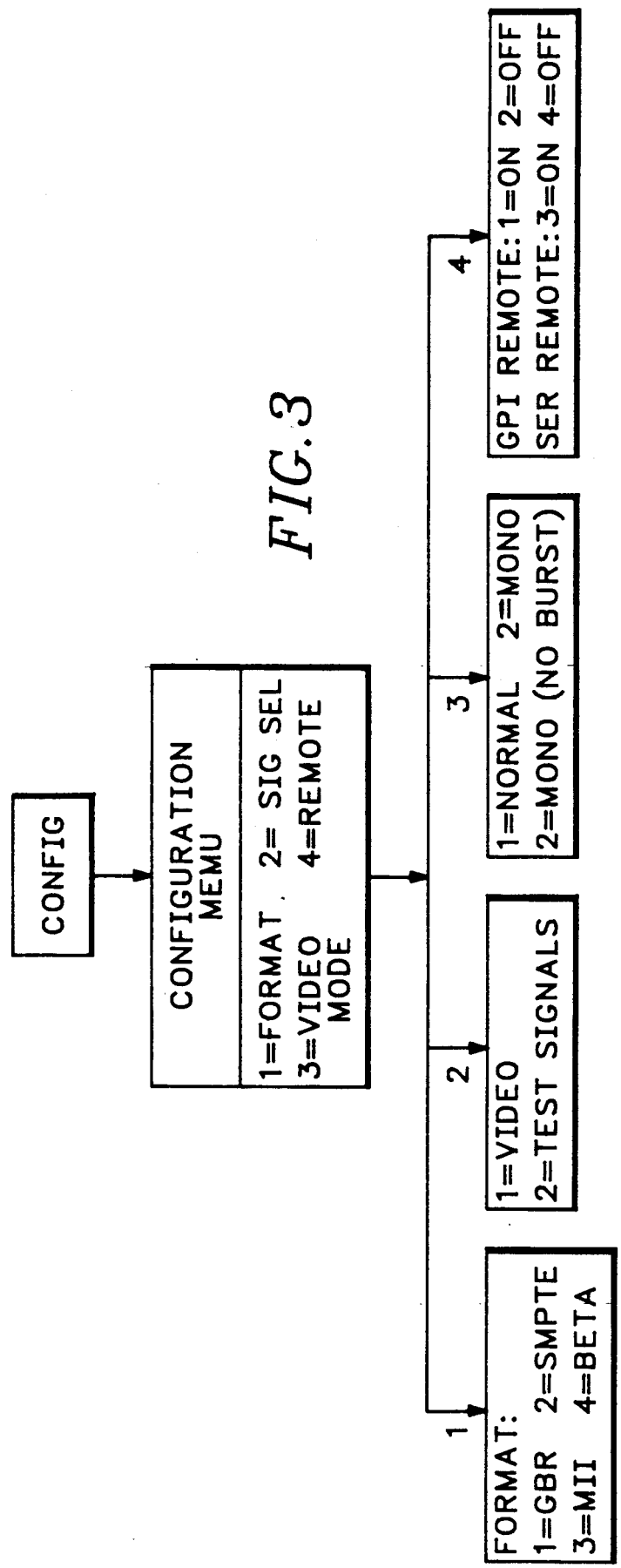
FIGS. 3-7 are flowcharts for operation of the television signal encoder/decoder control according to the present invention.
Figure 4:
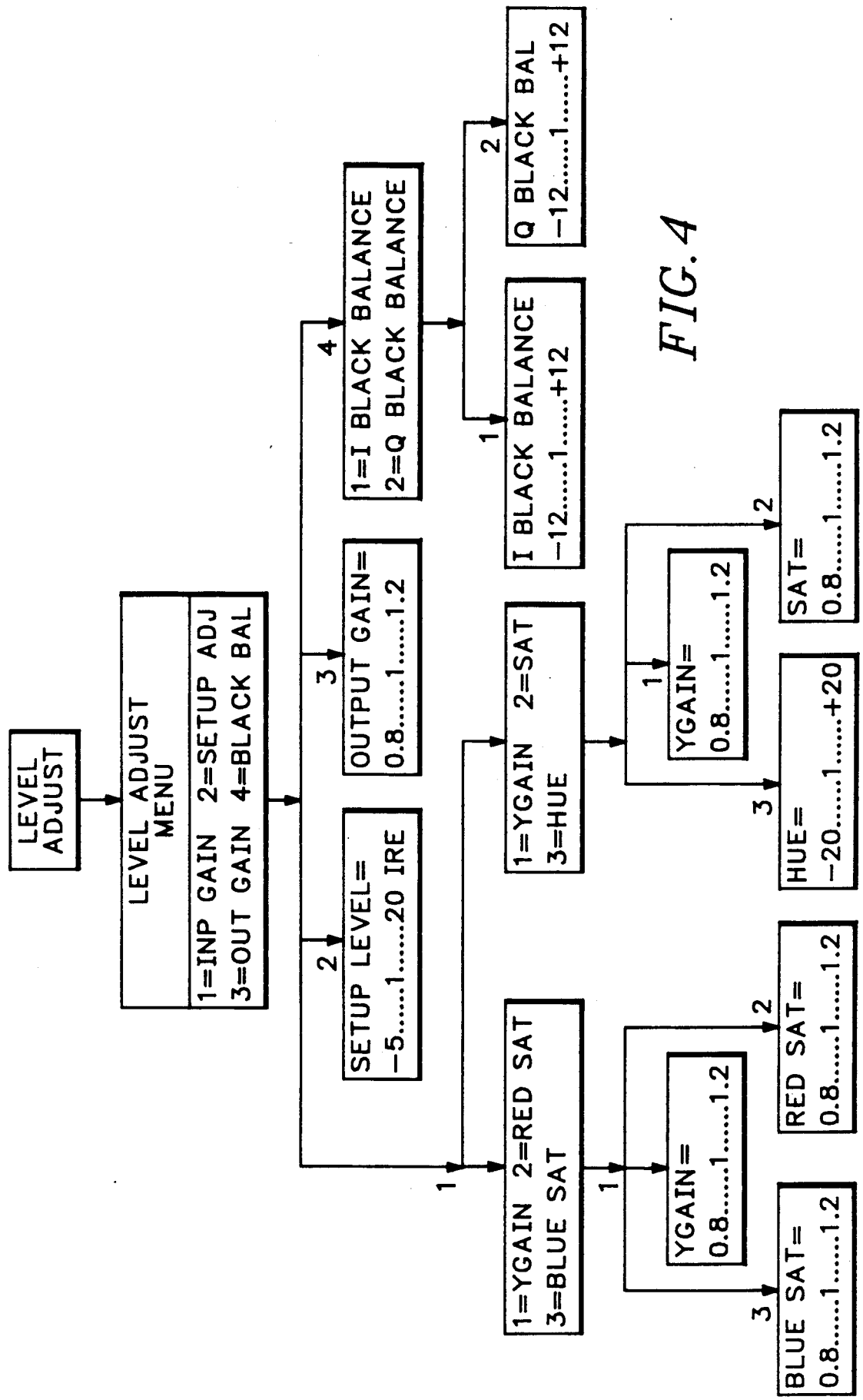

Referring now to FIG. 3 when the CONFIG button is pushed, a configuration menu is displayed and selection of the displayed choices is made by pushing the appropriate number on the numerical keypad. The routine then accesses the selected option and provides additional options to set up the encoder/decoder. Then when the LEVEL ADJUST button is pushed, a level adjust menu is displayed as shown in FIG. 4. The appropriate option is selected, again via the numerical keypad, and the next tier menu is displayed, either providing additional options or providing a display for adjusting the level. The numerical keypad then uses an alternative function to increase or decrease the desired level, the current level being displayed from the encoder/decoder via registers 26 over the data bus 16 to the microprocessor 10.

Figure 5:
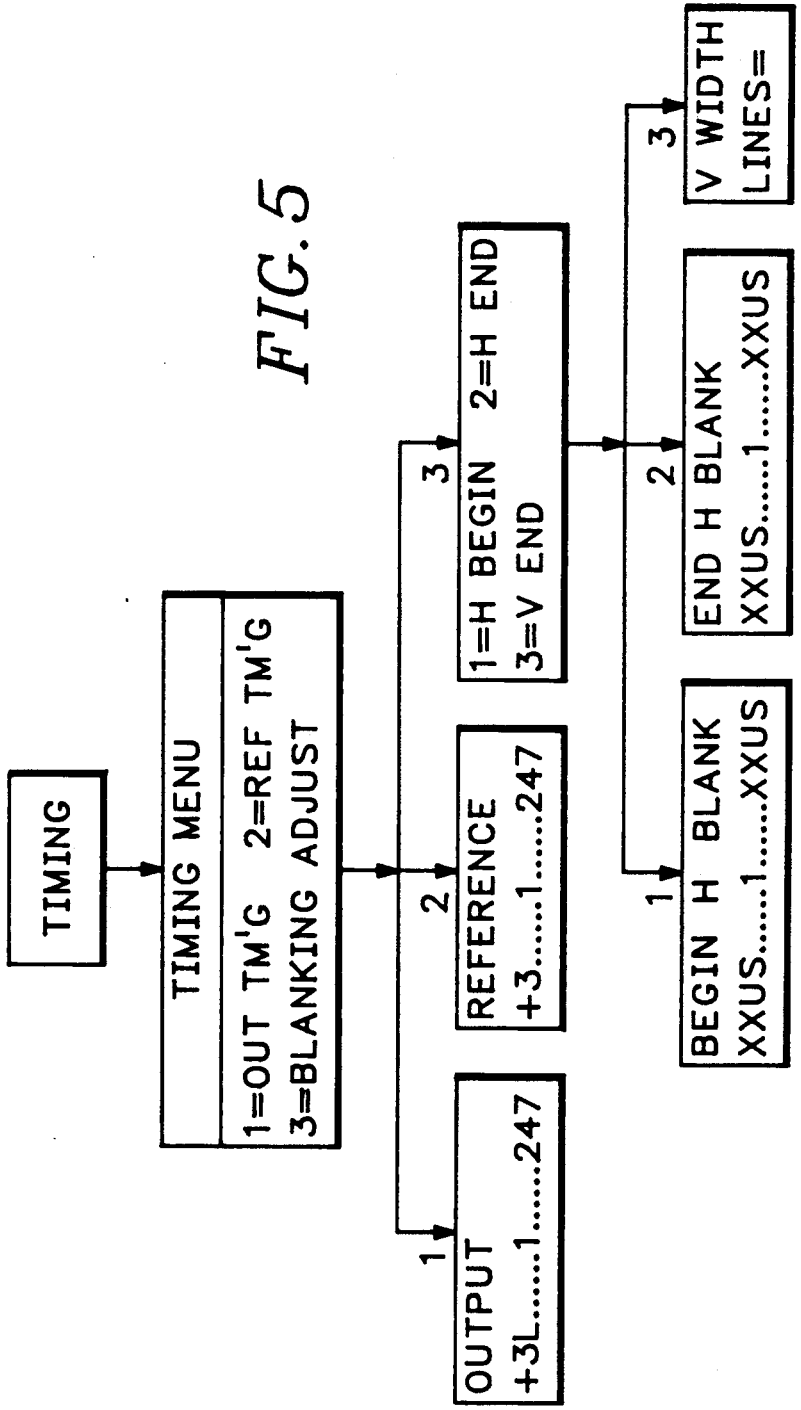
Figure 6:
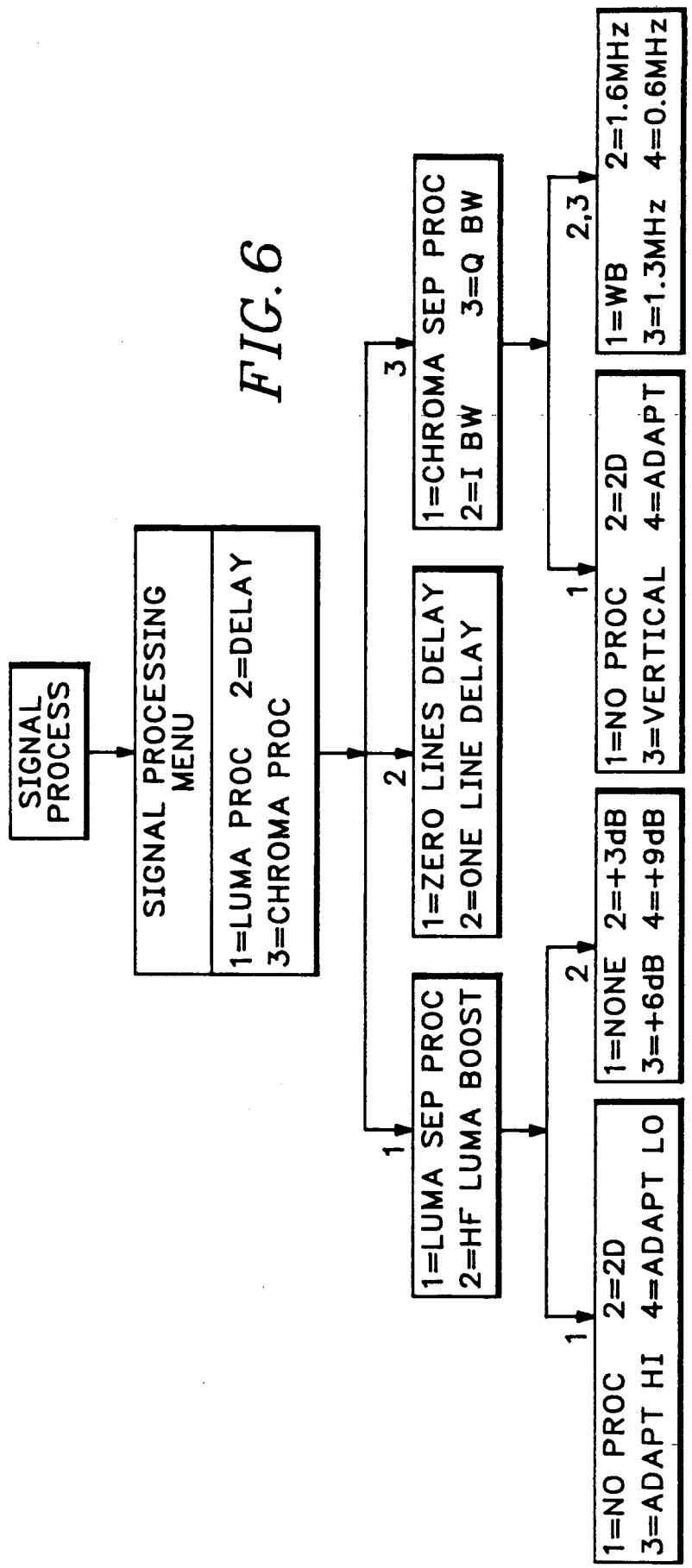

The TIMING button accesses a timing menu, shown in FIG. 5, to adjust timing for various signals, again selection being made via the numerical keypad, and "analog" values being selected by increasing or decreasing the current values also via the numerical keypad. The SIGNAL PROCESS button calls the signal processing routine shown in FIG. 6 to select appropriate luminance, chrominance and/or delay processing. Again the numerical keypad is made to make the desired selections at each tier of the routine. Once the encoder/decoder has been set up by operation of the CONFIG, TIMING, LEVEL ADJUST and SIGNAL PROCESS routines, the resulting setup may be displayed via the STATUS button and stored via the PRESETS button using a E-MEM routine.

Figure 7:
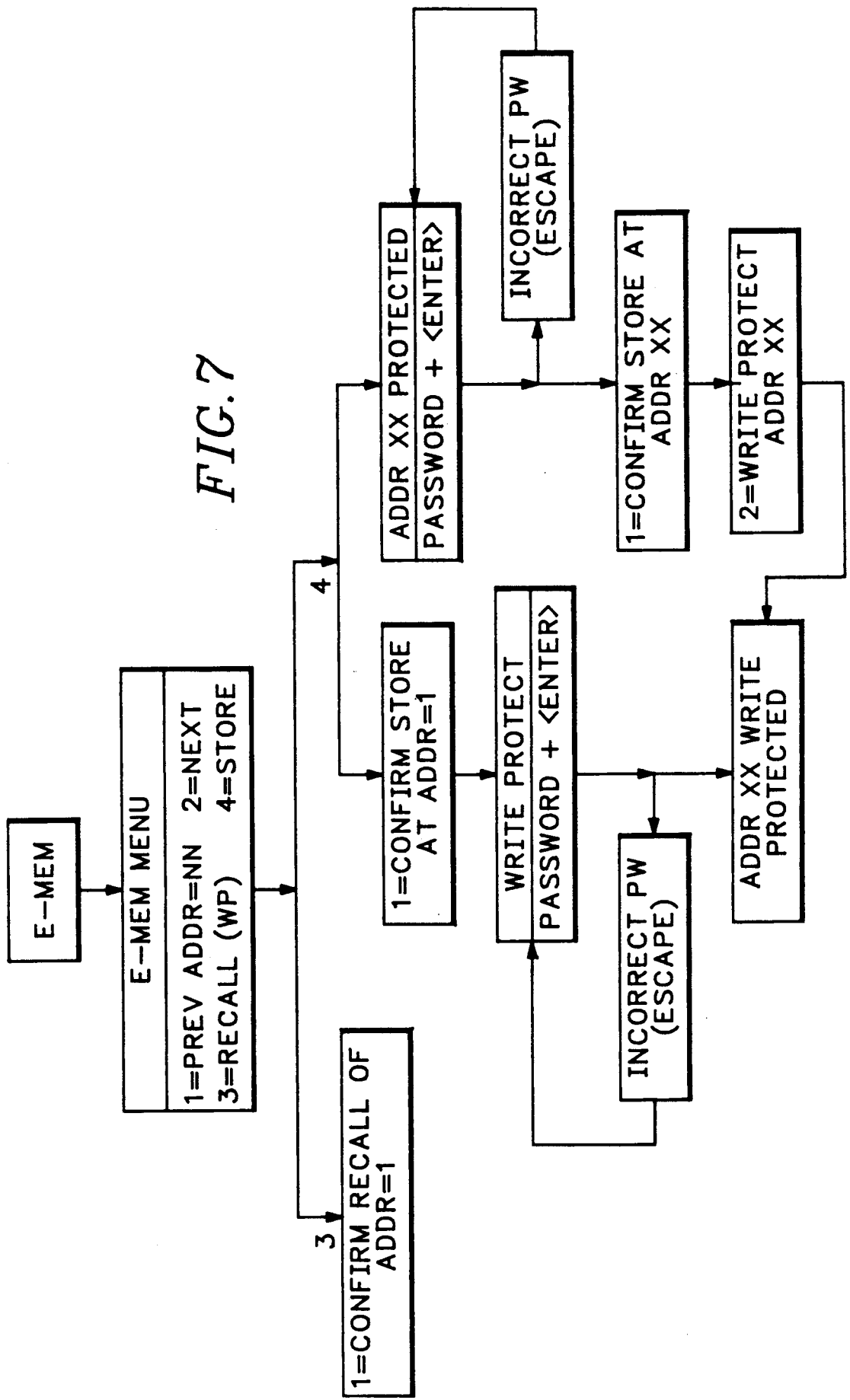

The E-MEM routine, shown in FIG. 7, presents a menu that allows the operator to select a particular preset by incrementing either forward or backward through the memory registers. Once a desired preset address is located, then the configuration of that address may be recalled, or the current configuration of the encoder/decoder may be stored for subsequent recall. For storing in an unused address the parameters are entered at that location and then write protected so that they are not inadvertently modified or erased. If the address is already being used, then a decision is made whether to change the preset. A correct password allows access to the address for entering new parameters, and then the preset is again write protected.

Thus the present invention provides a television signal encoder/decoder control that allows quick and easy modification of encoder/decoder parameters that can then be subsequently recalled during a video vertical interval.

What is claimed is:

1. A television signal equipment controller for modifying configuration parameters of television signal equipment comprising:

a microprocessor having an interface bus, an address bus, a data bus and associated memory;

means for communicating with the microprocessor over the interface bus to modify configuration parameters;

means for transferring the modified configuration parameters from the microprocessor to circuitry within the television signal equipment to present a selected configuration for the television signal equipment;

means for storing the configuration parameters representing the selected configuration in the associated memory for subsequent recall to set up the television signal equipment in the selected configuration; and means for allowing an operator to select a preset configuration within the means for storing.

2. A television signal equipment controller according to claim 1 further comprising:
   means for protecting preset configurations so that the preset configurations are not inadvertently modified or erased.

3. A television signal encoder/decoder having a controller for modifying configuration parameters of the television signal encoder/decoder, the controller comprising:
   a microprocessor;
   means for communicating with the microprocessor to modify configuration parameters;
   means for transferring the modified configuration parameters from the microprocessor to circuitry within the television signal encoder/decoder to present a selected configuration for the television signal encoder/decoder; and
   memory means for storing the configuration parameters representing the selected configuration for subsequent recall during a video vertical interval to set up the television signal encoder/decoder in the selected configuration.

4. A television signal encoder/decoder according to claim 3 further comprising:
   means for allowing an operator to select a preset configuration within the means memory.

5. A television signal encoder/decoder according to claim 4 further comprising:
   means for protecting preset configurations so that the preset configurations are not inadvertently modified or erased.

6. A television signal encoder/decoder according to claim 3 wherein the configuration parameters are members of the following set of configuration parameters:
   gain and offset levels;
   chrominance filter responses;
   luminance filter responses;
   input to output delay;
   anti-artifact processing options;
   test signals;
   delays and timing of an external timing reference;
   interface enabling and priorities;
   normal or monochrome encoding/decoding;
   burst inclusion on/off;
   non-standard signal routing;
   display or communication of encoder/decoder status;
   control of configuration memory;
   frame by frame control; and
   upload and download of parameters to/from an external memory via a remote interface.

7. A television signal equipment controller for modifying configuration parameters of television signal equipment comprising:
   a microprocessor;
   means for communicating with the microprocessor to modify a set of configuration parameters;
   means for transferring the modified set of configuration parameters from the microprocessor to circuitry within the television signal equipment to present a selected configuration for the television signal equipment;
   memory means for storing a plurality of sets of configuration parameters, each representing a selected configuration; and
   means for allowing an operator to select a set of configuration parameters from the plurality of sets of configuration parameters within the memory means to set up the television signal equipment in a particular selected configuration.

8. A television signal equipment controller according to claim 7 further comprising:
   means for protecting a set of configuration parameters so that the set of configuration parameters are not inadvertently modified or erased.

* * * * *